US012151344B2

(12) United States Patent
Radif et al.

(10) Patent No.: US 12,151,344 B2
(45) Date of Patent: Nov. 26, 2024

(54) POWER TOOL ATTACHMENT PART

(71) Applicant: ATLAS COPCO INDUSTRIAL TECHNIQUE AB, Stockholm (SE)

(72) Inventors: Nabil Khalil Radif, Nacka (SE); Ulf Mikael Eriksson, Vallentuna (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 319 days.

(21) Appl. No.: 17/627,395

(22) PCT Filed: Jul. 6, 2020

(86) PCT No.: PCT/EP2020/068946
§ 371 (c)(1),
(2) Date: Jan. 14, 2022

(87) PCT Pub. No.: WO2021/013506
PCT Pub. Date: Jan. 28, 2021

(65) Prior Publication Data

US 2022/0258313 A1 Aug. 18, 2022

(30) Foreign Application Priority Data

Jul. 24, 2019 (SE) .................................... 1930254-6

(51) Int. Cl.
*B25B 23/147* (2006.01)
*B25B 13/48* (2006.01)
(Continued)

(52) U.S. Cl.
CPC .......... *B25B 23/147* (2013.01); *B25B 21/002* (2013.01); *B25B 13/481* (2013.01); *B25B 23/1425* (2013.01)

(58) Field of Classification Search
CPC . B25B 21/007; B25B 21/002; B25B 23/1422; B25B 23/1425; B25B 23/147; B25B 13/481
See application file for complete search history.

(56) References Cited

U.S. PATENT DOCUMENTS 2,955,496 A * 10/1960 La Torre ............... B25B 21/002 81/57.14
4,287,795 A * 9/1981 Curtiss .................. B25B 21/002 81/57.3
(Continued)

FOREIGN PATENT DOCUMENTS

AU 2018251664 B2 * 1/2023 ............. B25B 13/48
EP 1779975 A1 5/2007
(Continued)

OTHER PUBLICATIONS

AU-2018251664-B2 (Year: 2018).*
(Continued)

*Primary Examiner* — David B. Thomas
(74) *Attorney, Agent, or Firm* — Moore & Van Allen PLLC; W. Kevin Ransom

(57) ABSTRACT

A power tool attachment part for a power tool, comprising: an elongate housing including an upper housing part and a lower housing part interconnected with the upper housing part, an input gear wheel configured to be connected to an output shaft of a power wrench, which input gear wheel is arranged at a first end of the housing, an output gear wheel with an output connection, which output gear wheel is arranged at a second end of the housing, an intermediate gear wheel arranged inside the housing and configured to transmit rotation of the input gear wheel to the output gear wheel, a socket arranged concentrically with and radially inside the output gear wheel, and a torque sensor configured
(Continued)

to measure the strain on the socket and thereby obtain a measure of the torque at the output gear wheel.

14 Claims, 3 Drawing Sheets

(51) Int. Cl.
*B25B 21/00* (2006.01)
*B25B 23/142* (2006.01)

(56) References Cited

U.S. PATENT DOCUMENTS 4,597,296 A * 7/1986 Crane .................. B25B 21/007 73/862.324
4,735,118 A * 4/1988 Broemel, Jr. ......... B25B 21/002 81/57.3
4,827,809 A * 5/1989 Broemel, Jr. ......... B25B 13/481 81/57.3
4,827,810 A 5/1989 Rushanan
4,926,699 A 5/1990 Salce, Sr.
4,942,794 A * 7/1990 Snyder .................. B25B 21/002 81/57.36
5,355,751 A * 10/1994 Specht .................. B25B 23/147 81/57.3
7,591,195 B2 * 9/2009 Puzio .................... B25B 23/147 73/862.324
8,590,402 B2 * 11/2013 Provost ..................... G01L 5/24 73/862.21
8,671,804 B2 * 3/2014 Galat .................... B25B 21/002 81/57.14
11,400,567 B2 * 8/2022 Langhorst ............... B25B 17/00
11,724,367 B2 * 8/2023 Eriksson ................. B25B 17/00 81/57
2005/0150335 A1 * 7/2005 Crane ..................... B25B 23/14 173/176
2010/0269646 A1 * 10/2010 Le Du ................... B25B 21/002 81/478
2012/0036970 A1 2/2012 Chen
2013/0233131 A1 9/2013 Badiali
2015/0314427 A1 * 11/2015 Carlsson ............... B25B 13/481 81/57.3
2019/0126448 A1 * 5/2019 Chu ........................ B25B 13/06
2020/0061780 A1 2/2020 Langhorst
2020/0254593 A1 * 8/2020 Hayashi ................ B25B 21/002
2021/0316427 A1 * 10/2021 Langhorst ............... B25B 13/08

FOREIGN PATENT DOCUMENTS

EP 3388199 A1 * 10/2018 ............. B25B 13/48
EP 3771519 A1 * 2/2021 ............. B25B 13/48
EP 3771519 B1 * 3/2023 ............. B25B 13/48
GB 2457578 A 8/2009
WO 2016176202 A1 11/2016
WO WO-2021023422 A1 * 2/2021 ............. B25B 13/48

OTHER PUBLICATIONS

EP-3771519-A1 (Year: 2019).*
EP-3771519-B1 (Year: 2019).*
WO-2021023422-A1 (Year: 2020).*
Atlas Copco Industrial Technique AB, International Patent Application No. PCT/EP2020/068946, International Search Report, Sep. 29, 2020.
Atlas Copco Industrial Technique AB, International Patent Application No. PCT/EP2020/068946, Written Opinion, Sep. 29, 2020.
Atlas Copco Industrial Technique AB, International Patent Application No. PCT/EP2020/068946, International Preliminary Report on Patentability, Jun. 24, 2021.
Atlas Copco Industrial Technique AB, Swedish Patent Application No. 1930254-6, Search Report, Feb. 6, 2020.
Atlas Copco Industrial Technique AB, European Patent Application No. 20737001.6, Communication pursuant to Rule 114(2) EPC, Mar. 1, 2023.

* cited by examiner

POWER TOOL ATTACHMENT PART

CROSS-REFERENCE TO RELATED APPLICATIONS

This application is a National Stage Patent Application (filed under 35 § U.S.C. 371) of PCT/EP2020/068946, filed Jul. 6, 2020 of the same title, which, in turn claims priority to Swedish Patent Application No. 1930254-6 filed Jul. 24, 2019 of the same title; the contents of each of which are hereby incorporated by reference.

FIELD OF THE INVENTION

The present disclosure relates to a power tool attachment part for a power tool.

BACKGROUND OF THE INVENTION

Power tool attachment parts are generally used in confined spaces where it is not possible to use an ordinary power tool to access a bolt or nut of the joint to be tightened. A power tool attachment part is also known as a crowfoot, a front part attachment or an offset attachment.

A power tool attachment part includes a plurality of gear wheels that transmit a rotating movement from an input gear wheel to an output gear wheel. The gear wheels are generally located in a row, teeth against teeth, inside an elongate housing.

The torque in a power tool is typically measured by a transducer arranged inside the power tool. The internal measurement in the power tool may however not provide an accurate measurement of the torque that the power tool attachment part attached to the power tool is being subjected to.

EP3388199 discloses a screw device including a crowfoot connected to the screw device. The crowfoot has helical gear wheels. The crowfoot includes a torque transducer configured to measure the torque of the gear wheel arranged adjacent to the output gear wheel. The torque measurement is based on the axial movement of the gear wheel and the transducer utilizes a load cell to determine the torque.

The helical gear tooth structure is required to be able to perform the torque measurements. There are however crowfoots that utilize other gear wheel designs such as straight gear wheels.

SUMMARY OF THE INVENTION

An object of the present disclosure is to provide an attachment part with which solves or at least mitigates problems of the prior art.

There is hence provided a power tool attachment part for a power tool, comprising: an elongate housing including an upper housing part and a lower housing part interconnected with the upper housing part, an input gear wheel configured to be connected to an output shaft of a power wrench, which input gear wheel is arranged at a first end of the housing, an output gear wheel with an output connection, which output gear wheel is arranged at a second end of the housing, an intermediate gear wheel arranged inside the housing and configured to transmit rotation of the input gear wheel to the output gear wheel, a socket arranged concentrically with and radially inside the output gear wheel, and a torque sensor configured to measure the strain on the socket and thereby obtain a measure of the torque at the output gear wheel.

The torque directly on the output gear wheel may hence be determined. This may result in a more exact torque measurement. Further, there are no limitations as to the type of gear wheels employed. The measurements may be performed irrespective of whether straight or helical gear wheels are provided in the power tool attachment part.

According to one embodiment the output gear wheel is spline locked with the socket.

The term spline locked means that the output gear wheel is provided with splines and that the socket is provided with splines engaging with the splines of the socket. The splines of the socket may be provided on an outer surface of the socket. The splines of the output gear wheel may be provided on the inner surface of the output gear wheel.

According to one embodiment the torque sensor includes a sleeve, the sleeve being arranged concentrically with and radially inside the output gear wheel, wherein the sleeve is spline locked with the socket.

The sleeve may be arranged radially inside the socket.

The term spline locked means that the sleeve is provided with splines and that the socket is provided with splines engaging with the splines of the sleeve. The splines of the sleeve may be provided on the outer surface of the sleeve. The splines of the socket engaging with the splines of the sleeve may be provided on the inner surface of the socket.

According to one embodiment the torque sensor comprises a light transmitter and a light receiver, wherein the sleeve has an axial end section which extends axially beyond the output gear wheel, the axial end section comprising a first disc provided with a plurality of first light slits distributed along the circumferential direction of the first disc, and wherein the socket comprises a second disc arranged adjacent to the first disc, the second disc being provided with a plurality of second light slits distributed along the circumferential direction of the second disc, wherein the light transmitter is configured to transmit light through the first light slits and the second slits and the light receiver is configured to detect light that has been transmitted through the first light slits and the second light slits, the amount of light transmitted through the first light slits and the second light slits depending on their relative alignment and providing a measure of the torque at the output gear wheel.

The strain on the socket is hence indirectly measured by measuring the strain on the sleeve which is spline locked with the socket. A measure of the torque on the output gear wheel can thereby be obtained.

The first disc may be rotationally fixed relative to the main body of the sleeve.

The second disc may be rotationally fixed relative to the main body of the socket.

According to one embodiment the torque sensor is provided on the socket.

According to one embodiment the torque sensor comprises a sound acoustic wave, SAW, sensor.

According to one embodiment the torque sensor comprises a strain gauge.

One embodiment comprises a slip ring configured to be slidably connected to the strain gauge. Measurements by the strain gauge may thereby be conveyed from the rotating strain gauge. The strain gauge may also be powered via the slip ring.

One embodiment comprises an electronics unit configured to receive measurements from the torque sensor.

According to one embodiment the electronics unit is configured to power the torque sensor. The electronics unit may for example comprise a battery or be configured to be connected by means of wires to the drive electronics of a power tool or to a control unit of a power tool.

According to one embodiment the electronics unit is configured to process the measurements. The electronics unit may hence comprise processing circuitry configured to process the measurements to e.g. determine the torque based on the measurements of the strain.

According to one embodiment the electronics unit is configured to transmit the measurements to a control unit of a power tool.

According to one embodiment the power tool attachment part is a crowfoot.

Other features and advantages of the present disclosure will be apparent from the figure and from the detailed description of the shown embodiments.

BRIEF DESCRIPTION OF THE DRAWINGS

In the following detailed description reference is made to the accompanying drawings, of which.

DETAILED DESCRIPTION OF THE INVENTION

Figure 1:
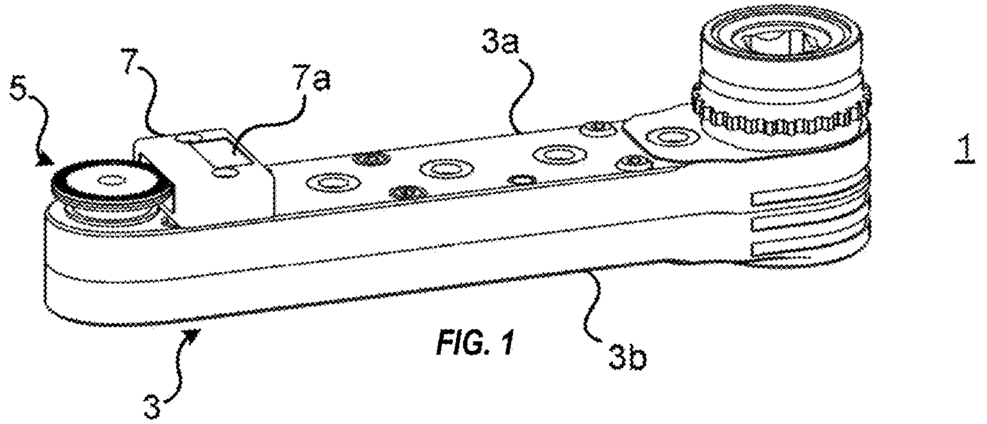
FIG. 1 shows a perspective view of an example of a power tool attachment part.

FIG. 1 depicts an example of a power tool attachment part 1 for a power tool. The power tool may for example be a wrench or a nut runner.

The exemplified power tool attachment part 1 is a crowfoot. The power tool attachment part 1 comprises an elongate housing 3. The elongate housing 3 comprises an upper housing part or first housing part 3*a* and a lower housing part or second housing part 3*b*. The upper housing part 3*a* is interconnected with the lower housing part 3*b*.

Figure 2:
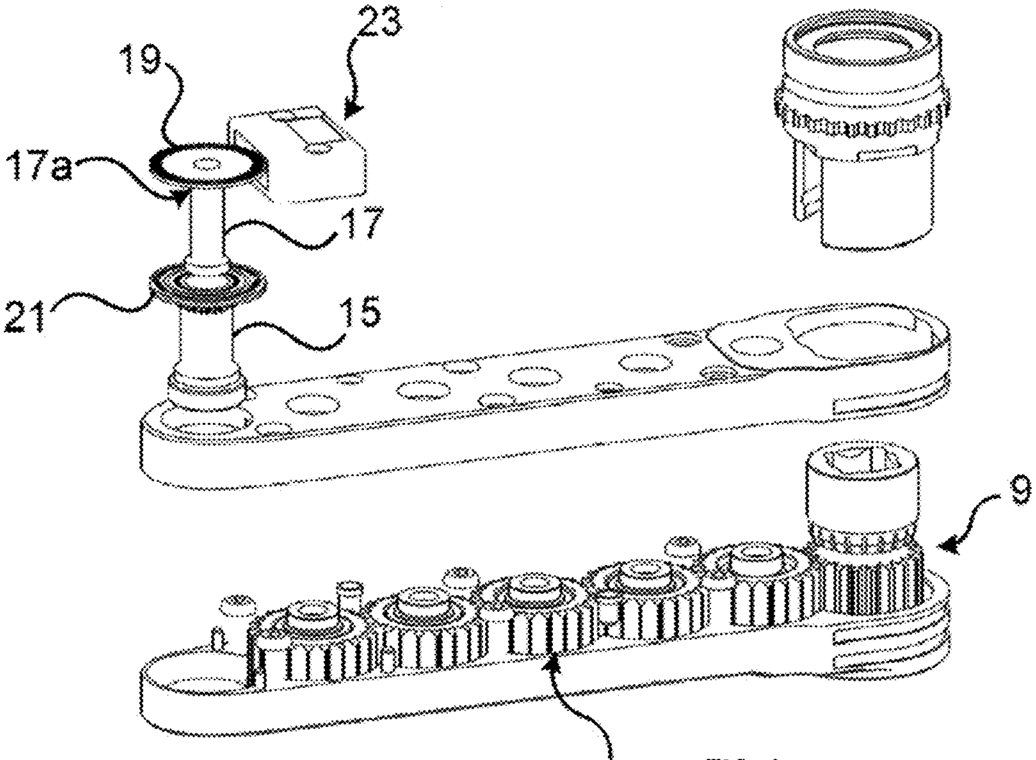
FIG. 2 is an exploded view of the power tool attachment part in FIG. 1.

FIG. 2 shows the power tool attachment part 1 in an exploded view. The power tool attachment part 1 comprises an input gear wheel 9 and an output gear wheel 11 arranged in the elongate housing 3. The input gear wheel 9 is arranged at a first end of the elongate housing 3. The output gear wheel 9 is arranged at a second end of the housing 3.

The power tool attachment part 1 furthermore comprises one or more intermediate gear wheels 13. The input gear wheel 9 is drivingly connected to the output gear wheel 11 via the one or more intermediate gear wheels 13. The one or more intermediate gear wheels 13 are configured to transmit the rotation of the input gear wheel 9 to the output gear wheel 11.

The output gear wheel 11 comprises an output connection 11*a*. The output connection 11*a* may be configured to receive for example a wrench bit, a screw bit, a nut or screw head.

The power tool attachment part 1 comprises a socket 15. The socket 15 is configured to be received by the output gear wheel 11. The socket 15 is provided with splines on its outer surface and the output gear wheel 11 is provided with splines on its inner surface configured to engage with the splines of the socket 15. The socket 15 and the output gear wheel 11 are thereby spline locked to each other.

The exemplified power tool attachment part 1 comprises a torque sensor 5. The torque sensor 5 is configured to measure the strain and hence the torque which the output gear wheel 11 is being subjected to. The torque may be deduced from the strain measurements. In the present example, the torque sensor 5 utilizes optical means for torque detection.

The exemplified torque sensor 5 comprises a sleeve 17 configured to be received by the socket 15. The sleeve 17 is hence arranged radially inside the socket 15. The sleeve 17 is provided with splines on its outer surface. The socket 15 is provided with splines on its inner surface. The sleeve 17 and the socket 15 are thereby spline locked to each other.

The sleeve 17 has an axial end section 17*a* which extends axially beyond the socket 15 inside the elongate housing 3. The axial end section 17*a* is provided with a first disc 19. The first disc 19 extends radially from the main body of the sleeve 17. The first disc 19 is rotationally fixed relative to the main body. The first disc is hence rotated concurrently with the main body.

The first disc is provided with a plurality of first light slits. The first light slits are distributed along the circumferential direction of the first disc 19. The first light slits extend through the first disc in the axial direction of the sleeve 17.

The socket 15 has a second disc 21 which is rotationally fixed to the socket 15. The second disc 21 is arranged adjacent to the first disc 19 in the axial direction of the output gear wheel 11. The second disc 21 is provided with a plurality of second light slits. The second light slits are distributed along the circumferential direction of the second disc 21. The second light slits extend through the second disc in the axial direction of the socket 15.

According to one example, a default relative position of the first light slits relative to the second light slits, when no torque is being present, may for example be when each first light slit is fully aligned with a respective second light slit. Other alternatives are also possible. For example, the first light slits and the second light slits may be arranged fully offset from each other in a default position when no torque is present. The relative movement between the first light slits and the second light slits with respect to the default relative position provides a measure of torque to which the sleeve 17 is being subjected. The relative movement in the circumferential direction between the first disc and the second disc is obtained due to the relative movement between the socket 15 and the sleeve 17 during operation of the power tool attachment part 1.

Figure 3:
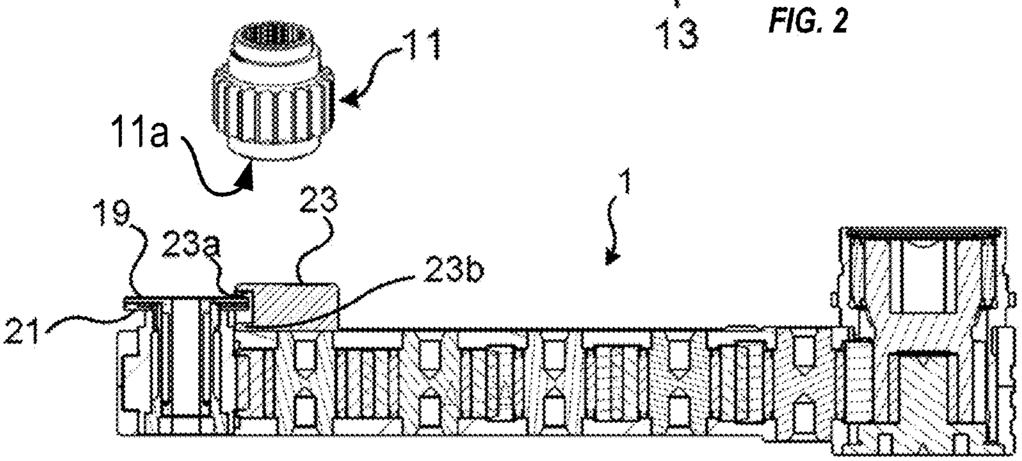
FIG. 3 is a longitudinal section of the power tool attachment part in FIG. 1.

The torque sensor 5 furthermore comprises an optical sensor 23. The optical sensor 23 comprises a light transmitter 23*a* and a light receiver 23*b*, as shown in FIG. 3. The light transmitter 23*a* is configured to transmit light through the first light slits and the second light slits. The light receiver 23*b* is configured to detect light that has been transmitted through the first light slits and the second light slits. To this end, the light transmitter 23*a* is provided on one side of the first disc 19 and the second disc 21 and the light receiver 23*b* is arranged offset from the light transmitter 23*a* in the axial direction of the output gear wheel 11, on the other side of the first disc 19 and the second disc 21.

The power tool attachment part 1 may optionally comprise an electronics unit 7. The electronics unit 7 and the optical sensor 23 are according to the present example integrated. The electronics unit and the optical sensor may alternatively be separate units/boxes. The electronics unit 7 may be configured to power the torque sensor 5. The electronics unit 7 may be configured to receive measurements from the torque sensor 5. The electronics unit 7 may be configured to process measurements from the torque sensor 5. For example, the electronics unit 7 may be configured to process the measurements or detections made by the light receiver and determine the torque corresponding to the relative position between the first disc and the second disc.

The electronics unit 7 may be configured to communicate wirelessly or by means of wires with a power tool, and/or to communicate wirelessly or by means of wires with a control unit configured to control the operation of the power tool. The electronics unit 7 may be configured to transmit unprocessed measurements and/or the processed measurements. Optionally, the electronics unit 7 may comprise a display unit 7*a* configured to display processed measurements from the torque sensor, for example the torque to which the sleeve 17 is being subjected to. The electronics unit 7 may be arranged on the outer surface of the elongate housing 3, for example on the upper housing part 3*a*.

The torque sensor 5 could alternative be configured to be electrically connected directly to the power tool and fed with power from the power tool.

Figure 4:
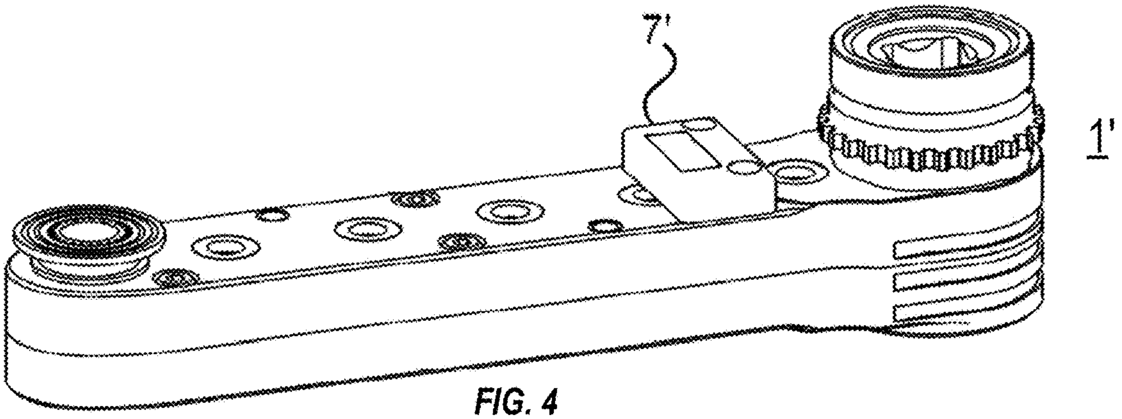
FIG. 4 depicts a perspective view of another example of a power tool attachment part.

FIG. 4 shows another example of a power tool attachment part 1'. The power tool attachment part 1' is similar to the power tool attachment part 1 but has a different type of torque sensor. The torque sensor 5' of the power tool attachment part 1' is based on surface acoustic wave (SAW) technology.

Figure 5:
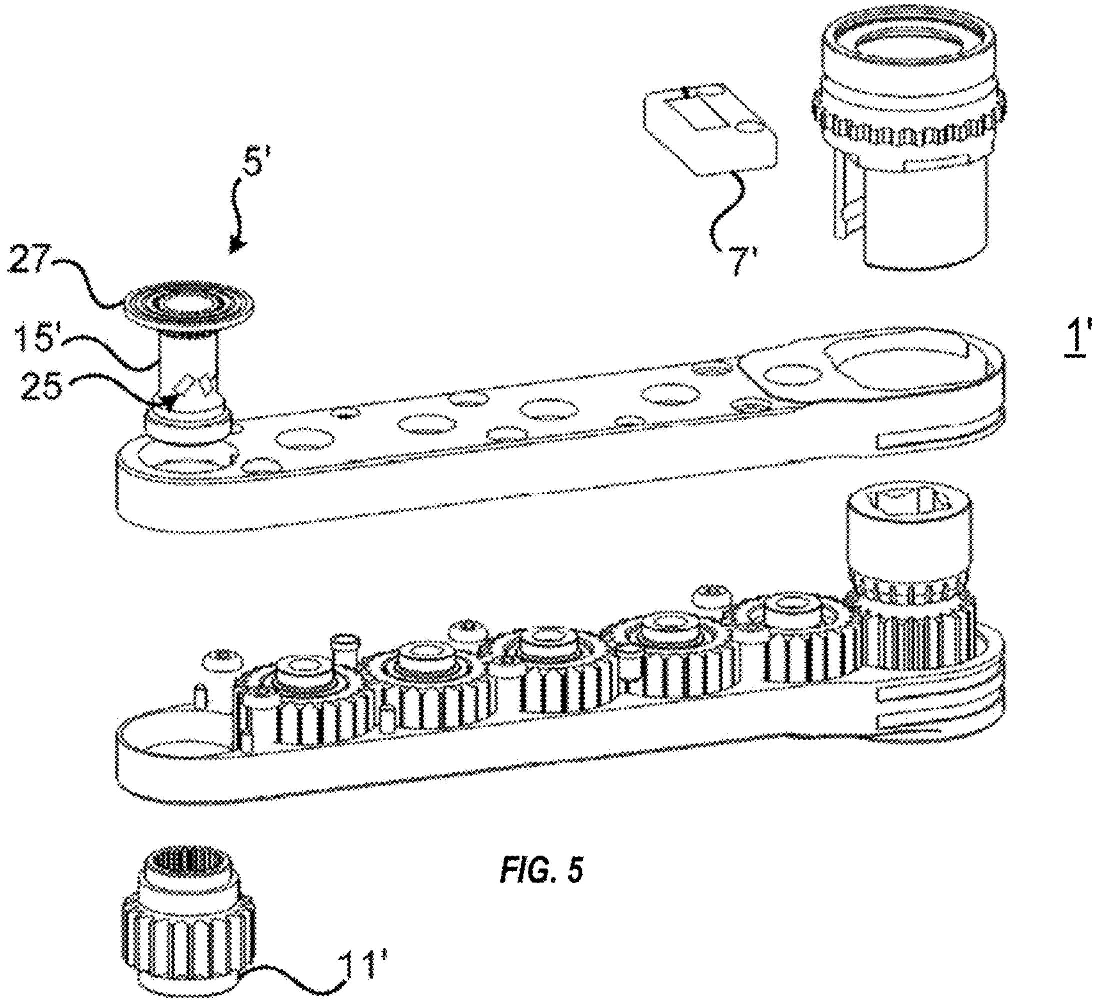
FIG. 5 is an exploded view of the power tool attachment part in FIG. 4.

With reference to FIG. 5, the power tool attachment part 1' comprises a socket 15' which is splice locked with the output gear wheel 11'. The socket 15' is configured to be received by the output gear wheel 11' and has an outer surface provided with splices configured to engage with splices provided on the inner surface of the output gear wheel 11'.

The torque sensor 5' comprises an SAW sensor 25 and an RF coupler 27. The SAW sensor 25 is provided on the socket 15'. The SAW sensor 25 may for example be arranged on the outer surface or the inner surface of the socket 15'. The SAW sensor 25 is configured to generate surface acoustic waves in the socket 15' and to detect the frequency of the thus induced acoustic waves. The latter is dependent of the strain on the socket 15'. The RF coupler 27 is configured to transmit the measurements made by the SAW sensor 25 wirelessly.

The power tool attachment part 1' may comprise an electronics unit 7' configured to receive measurements transmitted by the RF coupler 27. The electronics unit 7' may be configured to power the torque sensor 5'. The electronics unit 7' may be configured to process the measurements received from the RF coupler 27 to determine the torque to which the socket 15' is being subjected to. The electronics unit 7' may be configured to wirelessly or by means of wire transmit the measurements from the RF coupler 27 to the power tool and/or to a control unit configured to control the operation of the power tool.

Figure 6:
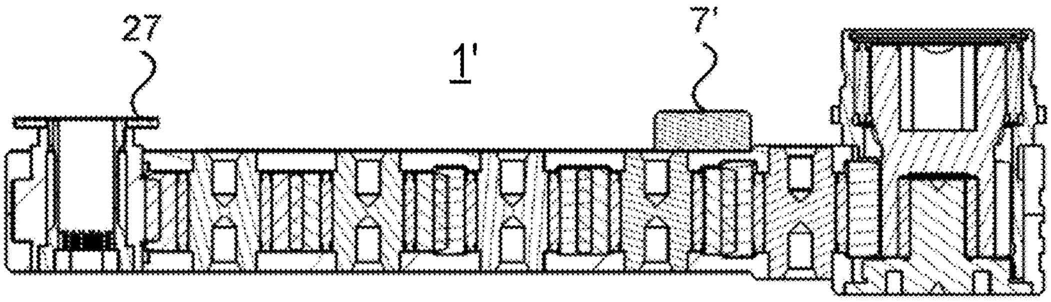
FIG. 6 is a longitudinal section of the power tool attachment part in FIG. 4.

FIG. 6 shows a longitudinal section of the power tool attachment part 1'.

Figure 7:
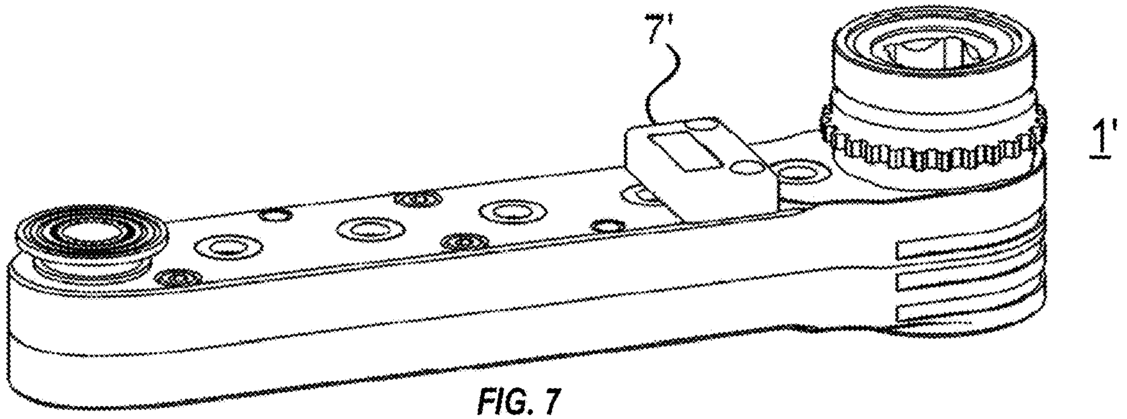
FIG. 7 depicts a perspective view of another example of a power tool attachment part.
Figure 8:
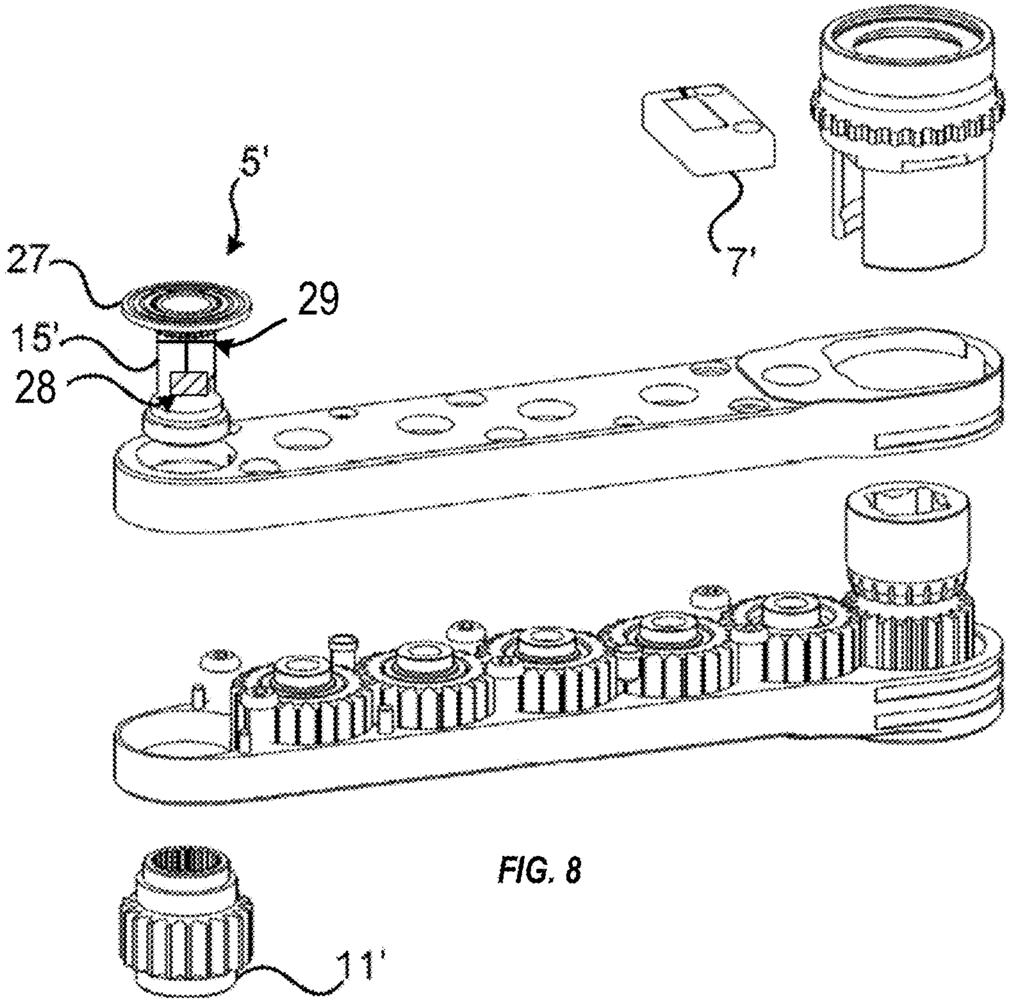
FIG. 8 is an exploded view of the power tool attachment part in FIG. 7.
Figure 9:
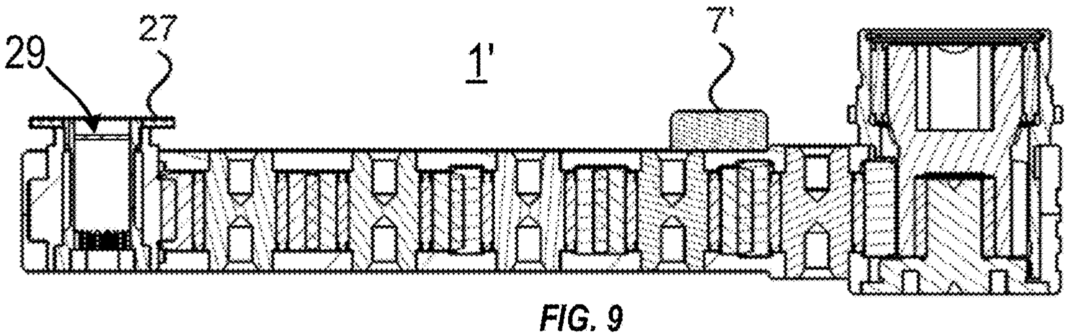
FIG. 9 is a longitudinal section of the power tool attachment part in FIG. 7.

According to one variation of the power tool attachment part 1' as shown in FIGS. 7-9, the SAW sensor and the RF coupler may be exchanged with one or more strain gauges 28 provided on the socket. The one or more strain gauges may be provided on the inner surface or the outer surface of the socket 15. The power tool attachment part may also comprise one or more slip rings 29, and the one or more strain gauges may be powered via the one or more slip rings. The measurements may also be conveyed from the one or more strain gauges via the one or more slip rings.

The electronics unit 7, 7' may comprise processing circuitry configured to process measurements from the torque sensor 5, 5'. Further, the electronics unit 7, 7' may comprise a storage medium comprising computer code which when executed by the processing circuitry causes the electronics unit 7, 7' to determine a torque at the output gear wheel based on the measurements from the torque sensor 5, 5'. The processing circuitry may be configured to display the determined torque on a display of the electronics unit 7, 7'.

The processing circuitry may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning the determination of the torque based on the measurements made by the torque sensor 5, 5'.

The storage medium may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The electronics unit 7, 7' may comprise a transmitter configured to wirelessly transmit measurements received from the torque sensor 5, 5' to a power tool or a control unit of a power tool, for example.

Above, the inventive concept has been described with reference to two specific embodiments. The inventive concept is however not limited to either of these embodiments. It is obvious to a person skilled in the art that the inventive concept may be modified within its scope, which is defined by the following claims.

The invention claimed is:

1. A power tool attachment part for a power tool, comprising:

- an elongate housing including an upper housing part and a lower housing part interconnected with the upper housing part;
- an input gear wheel configured to be connected to an output shaft of a power wrench, which input gear wheel is arranged at a first end of the housing;
- an output gear wheel with an output connection, which output gear wheel is arranged at a second end of the housing;
- an intermediate gear wheel arranged inside the housing and configured to transmit rotation of the input gear wheel to the output gear wheel;
- a socket arranged concentrically with and radially inside the output gear wheel; and
- a torque sensor configured to measure the strain on the socket and thereby obtain a measure of the torque at the output gear wheel.

2. The power tool attachment part as claimed in claim 1, wherein the output gear wheel is spline locked with the socket.

3. The power tool attachment part as claimed in claim 1, wherein the torque sensor is provided on the socket.

4. The power tool attachment part as claimed in claim 3, wherein the torque sensor comprises a sound acoustic wave (SAW) sensor.

5. The power tool attachment part as claimed in claim 3, wherein the torque sensor comprises a strain gauge.

6. The power tool attachment part as claimed in claim 5, comprising a slip ring configured to be slidably connected to the strain gauge.

7. The power tool attachment part as claimed in claim 1, comprising an electronics unit configured to receive measurements from the torque sensor.

8. The power tool attachment part as claimed in claim 7, wherein the electronics unit is configured to power the torque sensor.

9. The power tool attachment part as claimed in claim 8, wherein the electronics unit is configured to process the measurements.

10. The power tool attachment part as claimed in claim 7, wherein the electronics unit is configured to transmit the measurements to a control unit of a power tool.

11. The power tool attachment part as claimed in claim 1, wherein the power tool attachment part is a crowfoot.

12. A power tool attachment part for a power tool, comprising:

- an elongate housing including an upper housing part and a lower housing part interconnected with the upper housing part;
- an input gear wheel configured to be connected to an output shaft of a power wrench, which input gear wheel is arranged at a first end of the housing;
- an output gear wheel with an output connection, which output gear wheel is arranged at a second end of the housing;
- an intermediate gear wheel arranged inside the housing and configured to transmit rotation of the input gear wheel to the output gear wheel;
- a socket arranged concentrically with and radially inside the output gear wheel; and
- a torque sensor configured to measure the strain on the socket and thereby obtain a measure of the torque at the output gear wheel, wherein the torque sensor comprises a sleeve, the sleeve being arranged concentrically with and radially inside the output gear wheel, wherein the sleeve is spline locked with the socket.

13. The power tool attachment part as claimed in claim 12, wherein the torque sensor comprises a light transmitter and a light receiver, wherein the sleeve has an axial end section which extends axially beyond the output gear wheel, the axial end section comprising a first disc provided with a plurality of first light slits distributed along the circumferential direction of the first disc, and wherein the socket comprises a second disc arranged adjacent to the first disc, the second disc being provided with a plurality of second light slits distributed along the circumferential direction of the second disc, wherein the light transmitter is configured to transmit light through the first light slits and the second slits and the light receiver is configured to detect light that has been transmitted through the first light slits and the second light slits, the amount of light transmitted through the first light slits and the second light slits depending on their relative alignment and providing a measure of the torque at the output gear wheel.

14. A power tool attachment part for a power tool, comprising:

- an elongate housing including an upper housing part and a lower housing part interconnected with the upper housing part;
- an input gear wheel configured to be connected to an output shaft of a power wrench, which input gear wheel is arranged at a first end of the housing;
- an output gear wheel with an output connection, which output gear wheel is arranged at a second end of the housing;
- an intermediate gear wheel arranged inside the housing and configured to transmit rotation of the input gear wheel to the output gear wheel;
- a socket arranged concentrically with and radially inside the output gear wheel;
- a torque sensor configured to measure the strain on the socket and thereby obtain a measure of the torque at the output gear wheel, wherein the torque sensor is located on the socket; and
- a slip ring configured to be slidably connected to the torque sensor.

* * * * *